United States Patent [19]

Bulwith

[11] 4,159,762
[45] Jul. 3, 1979

[54] ARTICLE TRANSFERRING APPARATUS

[75] Inventor: Joseph P. Bulwith, Wayne, N.J.

[73] Assignee: Avon Products, Inc., Suffern, N.Y.

[21] Appl. No.: 868,917

[22] Filed: Jan. 12, 1978

Related U.S. Application Data

[63] Continuation of Ser. No. 722,124, Sep. 10, 1976, abandoned.

[51] Int. Cl.$^2$ ............................................. B65G 37/00
[52] U.S. Cl. ................................... 198/472; 198/648; 198/653; 198/696
[58] Field of Search ............... 198/339, 343, 472, 473, 198/479, 653, 648, 680, 694–696; 214/1 BA; 269/55, 58, 229, 233; 101/35; 118/503; 134/126, 152; 206/477, 480, 482, 483

[56] References Cited

U.S. PATENT DOCUMENTS

| | | | |
|---|---|---|---|
| 2,344,000 | 3/1944 | Read | 198/653 |
| 2,688,352 | 9/1954 | Aslock | 198/696 |
| 3,538,997 | 11/1970 | Christine et al. | 198/648 |
| 3,805,944 | 4/1974 | Yuryan | 198/696 |
| 3,882,991 | 5/1975 | Chayka et al. | 198/696 |

FOREIGN PATENT DOCUMENTS 88328  1/1937  Sweden .................... 198/694

Primary Examiner—Joseph E. Valenza
Attorney, Agent, or Firm—Pennie & Edmonds

[57] ABSTRACT

An apparatus for transferring containers of different dimensions along a predetermined path defined by a conveying mechanism provided with camming members at selected points along the path comprising housing means being transportable along the predetermined path, gripping means including at least one pair of first and second gripping elements connected to said housing and being movable between a gripping position whereat a container is firmly and positively gripped, and a non-gripping position whereat the container can be freely moved from between said elements; and actuating means including separate actuating members, each connected to corresponding ones of said gripping elements and being independently and continuously engageable with the camming members for enabling independent and/or simultaneous movement of the gripping members between the gripping and non-gripping positions.

12 Claims, 8 Drawing Figures

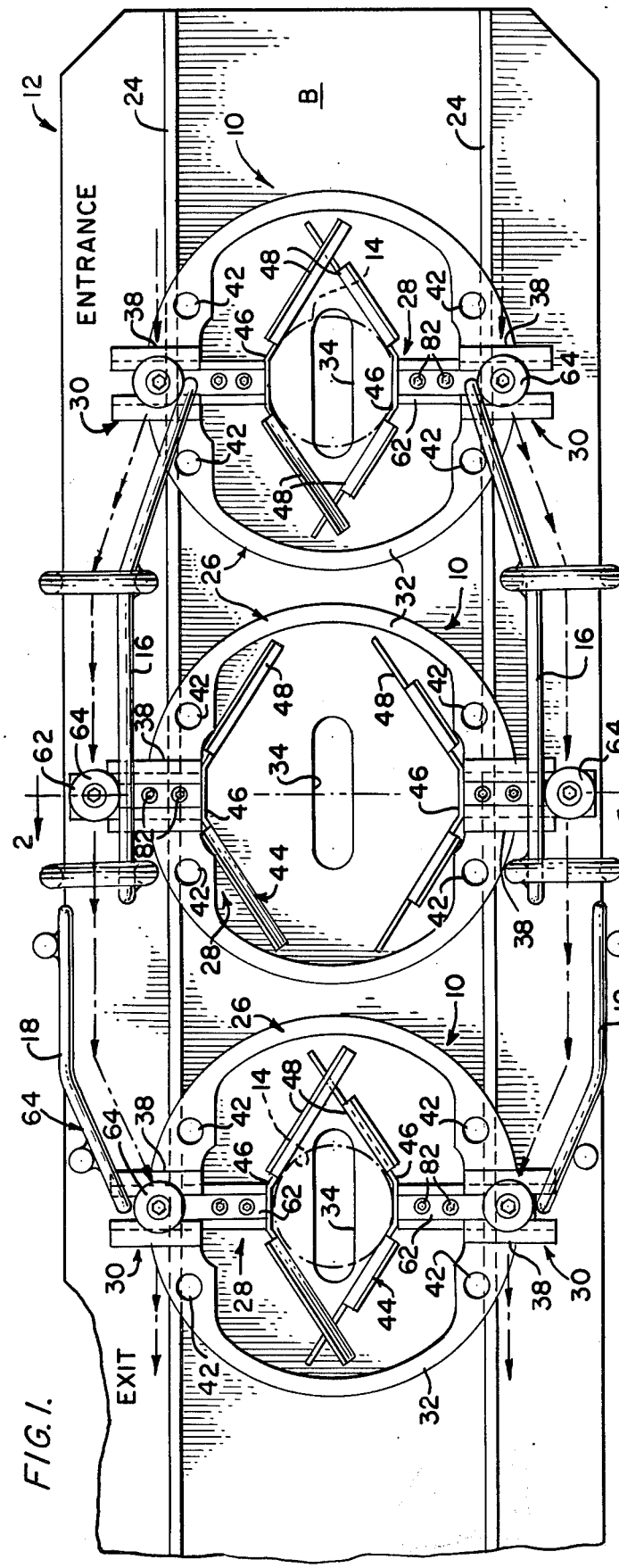

FIG. 3.

ARTICLE TRANSFERRING APPARATUS

CROSS-REFERENCES TO RELATED APPLICATIONS

This application is a continuation of application Ser. No. 722,124, filed Sept. 10, 1976, and now abandoned.

BACKGROUND OF THE INVENTION

1. Field of the Invention

The instant invention is directed to an article transferring apparatus, and, more particularly, it pertains to a novel and improved transferring apparatus for securely transferring containers of varying size without changeover type adjustments being made to the apparatus.

2. Description of the Prior Art

In industry it is common practice to convey a plurality of articles or containers having various sizes along an elongated predetermined path by a conveyor mechanism. Normally, these articles or containers are placed in a suitable transferring or carrying apparatus which is mounted for movement in timed relation with the conveyor along the predetermined path.

Conventional approaches for transferring the containers include carrying devices which are specifically molded so as to conform to specific individual container dimensions and configurations. Consequently, it will be appreciated that, for each new container which is to be transferred, an individual carrying device must also be fabricated so as to generally conform to the container dimensions and configuration. Obviously, the foregoing presents significant disadvantages in that eachtime a new product line is being transferred by a different container, the manufacture of corresponding carrying devices therefore represents considerable costs. In practice, by reason of the foregoing particular approach, other significant shortcomings are encountered, such as with the procurement costs and ordinary lead times involved for ordering each of the new carrying devices. A further drawback associated with this particular approach is the need for consequent storage facilities which must be provided for whenever these carriers are not utilized.

Aside from the foregoing disadvantages, it will be understood that each time there is a changeover from one container to another, thereby necessitating the formation and use of a different specific carrying device therefor, considerable handling costs are normally involved in replacing these carrying devices on the conveying apparatus. This factor, of course, further adds to the overall costs involved during a changeover operation. In addition, prior molded type carrying devices must be produced with a relatively loose fit so as to provide a loading or unloading clearance for the containers during transit. As a result of such clearance, there exists a likelihood that during transit the containers might be moved such that damage might occur thereto. In this latter regard, the carrying devices would fail to perform their intended function. Other shortcomings associated with this minimum loading clearance are that it not only adds extra machining costs to changeover but, also, there exists the inability of the carriers to accept so-called "out of spec" containers.

From the foregoing considerations, it will be recognized that heretofore known carrying devices, particularly of the molded type, are unable to effectively, simply, and reliably provide a single or common carrier particularly adapted for carrying and positively holding containers of various dimensions without requiring changeover type adjustments being made to the carrying device itself for carrying different containers.

SUMMARY OF THE INVENTION

It is an object of the instant invention to overcome the numerous disadvantages associated with heretofore known approaches for transferring containers of varying sizes along a conveying path, by providing an apparatus for firmly holding and transferring containers of different dimensions.

Briefly, in accordance with this invention, the apparatus for transferring containers of different dimensions along a predetermined path defined by a conveying mechanism provided with a camming members at selected points along the path comprises housing means being transportable along the predetermined path. Also envisioned are gripping means including at least a pair of first and second gripping position, whereat a container is firmly and positively gripped, and a non-gripping position, whereat the container can be freely moved from between the elements. The invention further contemplates actuating means including separate actuating members, each connected to corresponding ones of the gripping elements, and being independently and continuously engageable with the camming members for enabling independent and/or simultaneous movement of the gripping elements between the gripping and non-gripping positions.

BRIEF DESCRIPTION OF THE DRAWINGS

The above as well as other objects, features, and advantages of the present invention shall become readily apparent upon reading a detailed description thereof when viewed in conjunction with the accompanying drawings, wherein like reference numerals indicate like structure throughout the several views.

FIG. 1 is a plan view of one embodiment of the novel and improved transferring apparatus of the present invention shown cooperating with a guide transfer system for actuating the apparatus;

FIG. 2 is a cross-sectional view taken substantially along section line 2—2 appearing in FIG. 1 looking in the direction of arrows and illustrating details of the embodiment of the transferring apparatus shown in the preceding FIG. 1;

FIG. 2A is a cross-sectionalview taken substantially along section line 2A—2A appearing in FIG. 2 looking in the direction of the arrows and illustrating another components of the transferring apparatus with portions removed for clarity;

FIG. 3 is a plan view illustrating a second novel and improved embodiment of a transferring apparatus embodying the principles of this invention and being shown cooperating with an actuating guide system therefor;

DETAILED DESCRIPTION

Figure 4:
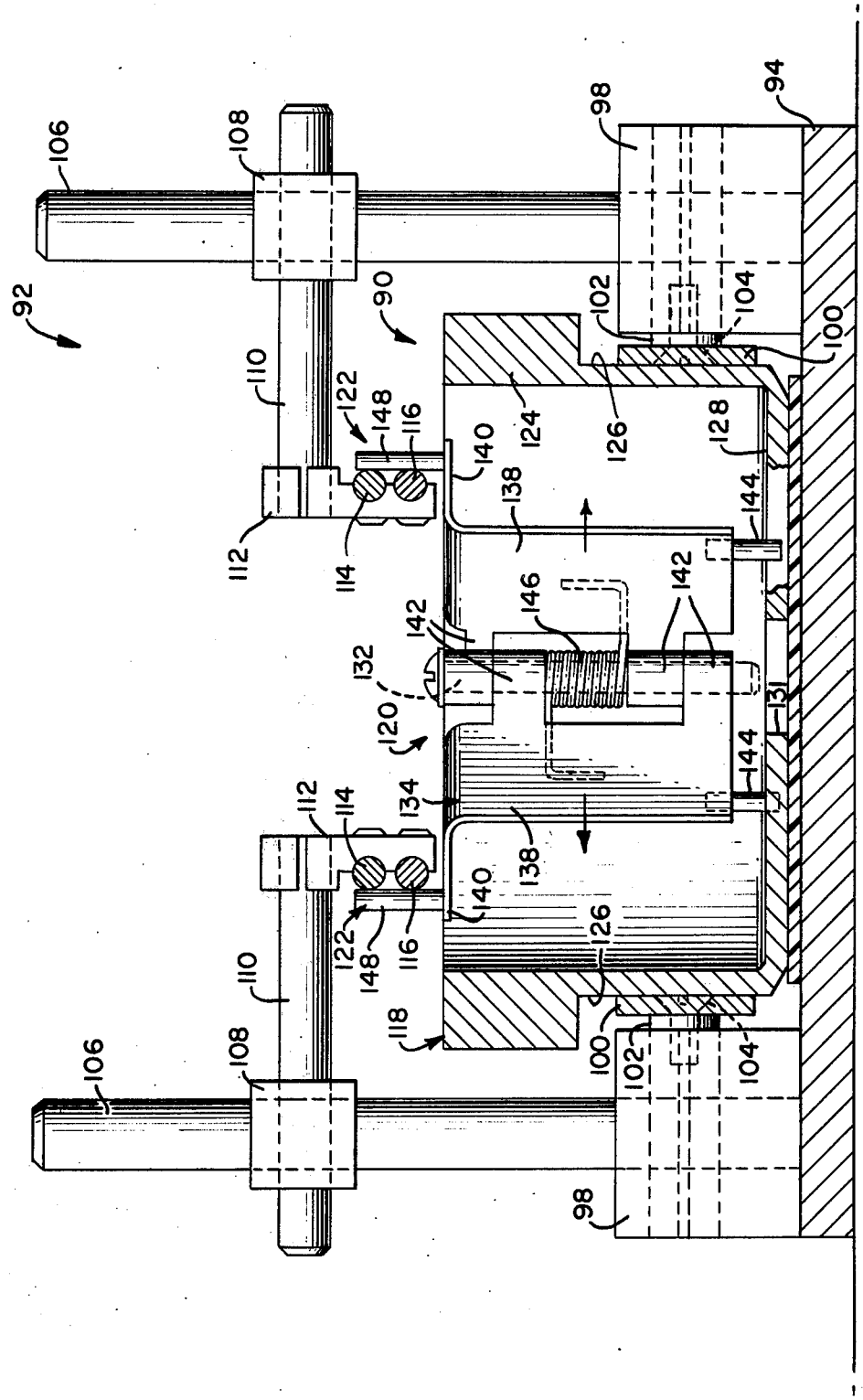
FIG. 4 is an end sectional view taken substantially along the section line 4—4 appearing in FIG. 3 looking in the direction of the arrows and illustrating certain other details of the transfer apparatus as seen in FIG. 3.

Specifically referring to FIGS. 1, 2 and 2A of the present drawings, there is depicted one embodiment of a transferring apparatus embodying the principles of the instant invention and being designated generally by reference numeral 10. This particular transferring apparatus 10 is shown cooperating with a guide rod system 12 which serves to selectively actuate and deactuate the transferring apparatus 10 for purposes of positively holding and freely releasing containers 14. As will be subsequently elaborated upon in the succeeding description of this embodiment, transferring apparatus 10 is able to effectively, simply, and reliably positively grasp and easily release containers having various sizes without requiring changeover to the apparatus itself. As a consequence thereof, the prior art shortcoming of fabricating a transfer apparatus for each different product line is foreclosed.

The guide rod system 12 being depicted in FIGS. 1 and 2 is only for purposes of illustration. It will be understood that other guide rod constructions are possible for effectuating the actuation and deactuation of transferring apparatus 10. Each of the transferring apparatus 10 depicted in FIG. 1 may be conveyed by any suitable conveying mechanism, such as a conventional delrin type conveyor belt B. The conveyor B serves to advance each apparatus 10, as by frictional forces, along a predetermined path from, as indicated by the arrows in FIG. 1, an entrance end to an exiting end. Along the predetermined path at selected locations are generally elongated guide rods or camming track members 16 and 18 laterally spaced apart from each other, in a manner to be mentioned, and vertically raised by upright supports 20 from base 22 for cooperating with transferring apparatus 10 in a fashion to be afterwards explained. Also, conventional type guide rails 24 are suitably supported by base 22 and are generally parallel and spaced apart for purposes of guiding the apparatus 10 along the path.

More particularly referring to transferring apparatus 10, such basically includes housing means 26, gripping means 28, and actuating means 30. The housing means 26 is defined by a cylindrical shell type walled member 32 having a bottom with an elongated slot 34, opposed flat surfaces 36 for slidably engaging the guide rails 24, and a pair of opposed recesses 38 in the wall with projecting support flanges 40. The elongated slot 34 may cooperate, in a known manner, with a standard type of ink applying device for purposes of properly coding a container. In addition, each transfer apparatus 10 is formed with pairs of countersunk blind retaining bores 42. Each pair of retaining bores 42 is arranged to straddle the opposed recesses 38.

Essentially, such bores 42 automatically, slidably and releasably cooperate with corresponding projections formed on suitable mechanisms which are of the type that usually cooperate with the containers in a customary fashion. By virtue of the foregoing approach, retaining bores 42 will assure that the apparatus 10 remains in the intended path notwithstanding the absence of containers from the apparatus 10. It will be appreciated that such transferring apparatus 10 would otherwise fall from the intended path of a container, which it was supposed to carry was absent therefrom. Consequently, a simple retaining arrangement is provided for ensuring an uninterrupted assembly line operation.

In connection with the gripping means 28, it will be observed that such is defined by an opposed pair of interfitting gripping members 44 fixedly connected to the actuating means 30 for generally conjoint movement therewith. Essentially, each of the gripping members 44 is defined by an integral plate having a central section 46 and a pair of angularly oriented flat plate portions 48. The central section 46 is affixed to actuating means 30 by cap screws 50 or the like. Opposed pairs of angular oriented plate portions 48 have a plurality of projections 52 and 52a and notche or cutouts 54 and 54a, respectively, formed along their outer edges. It will be understood that cutouts 54 and 54a are arranged in a fashion such that cutouts 54a of one pair of plate portions 48 receive the projections 52 of the opposing pair of plate portions 54. Similarly, cutouts 54 are arranged to receive projections 52a of the other plate portions 48 formed on gripping element 44. By virtue of the foregoing arrangement, gripping elements 44 can be brought relatively closer together through the interfitting and cooperating relationship mentioned above, such as more clearly depicted by the leading and trailing apparatus 10 in FIG. 1. Moreover, the angular orientation of the plate portions 48 serve to inwardly force and center a container held thereby. Thus, the container will be properly centered over the slot 34 for enhancing the ink coding of the container. As a result of this interfitting relationship the transferring apparatus 10 is even more versatile in that it is able to more positively hold containers of smaller size than would be otherwise permitted without such projections and notches. Further, it should be pointed out that, while the foregoing construction is preferred for the gripping elements 44, other types of constructions are embraceable by the principles of the invention.

The gripping elements 44 are movable, as afterward more completely explained, between gripping and non-gripping positions. Of course, in the gripping position, the opposed gripping elements 44 are brought together into a positive engaging relationship with the container 14. As a consequence thereof, such container 14 is firmly and yieldably engaged. In the non-gripping position, as more clearly depicted by the centrally positioned apparatus 10 in FIG. 1, such elements 44 are further spaced away from each. In this particular position of components, the containers 14 can be freely removed and/or inserted.

As concerns actuating means 30, such is more particularly shown in FIGS. 2 and 2A. It will be noted that in accordance with this embodiment actuating means 30 cooperates with each guiding element 44 and includes sliding means 56 and contacting means 58. Sliding means 56 is defined by a guide housing 60, sliding vee-type block 62 and actuating element or cam roller 64. As more clearly noted in FIG. 2A, guide housing 60 has two upstanding tapered walls 66 and a flat base 68. Each flat base 68 is fastened to the corresponding flange 40, associated with each of recesses 30 formed in the shell 32, through cap screws 70 and 72, much as in the manner depicted in FIG. 2. The sliding vee-block 62 has complementary tapered sidewalls to those of upstanding sidewalls 66. By this particular arrangement, a dovetail form of sliding relationship between sliding block 62 and guiding housing 60 is attainable. An elongated notch 74 is formed in the bottom surface of the flat base 68 of sliding block 62. The particular significance of such will be presently explained.

In addition, sliding block 62 is formed with a pair of parallel and vertically situated bores 76 for purposes of cooperating with the contacting means 58 in a fashion to be later mentioned. Each of the bores 76 has a threaded upper section. The cam roller 64 is fastened as by a threaded member to a corresponding threaded opening formed in the top of block 62. Each cam roller 64, of course, serves to continuously engage and follow the contours of respective camming tracks 16, 18, in a known fashion so as to effectuate the extent and duration the gripping elements 44 will be in and move between their respective gripping and non-gripping positions. In practice, it is beneficial to have the elements 44 open and close at the same rate. Although transferring apparatus 10 is depicted as cooperating with one particular configuration and orientation of cam tracks 16, 18, others are envisioned. Thus, the transferring apparatus 10 is extremely adaptable to many situations.

As mentioned earlier, actuating means 30 further includes contacting means 58. Such contacting means 58 may be defined by a generally elongated friction pin member 78 received within the notch or recess 74 for frictionally engaging the bottom surface of the guide housing 60. The flat friction pin member 78 being illustrated can, of course, have various suitable configurations other than that depicted. Such pin 78 is, of course, made from a material which generates sliding friction with the guide housing 60 such that the sliding block 62 will be advanced only after a significant predetermined force is applied to overcome such sliding friction. Any suitable material having the desired friction producing characteristics can be applied for achieving the foregoing end. Accordingly, since a certain amount of force is required to overcome the friction produced by pin 78, there exists a tendency for the cam roller 64 to continuously engage the camming tracks or guide rods 16 without inadvertently moving to an unintended position. Consequently, the grasping elements 44 can reliably, simultaneously and independently open and close in a simple fashion.

The contacting means 58 of this embodiment also is comprised of adjusting means 80 for adjusting the amount of frictional forces friction pin 78 will exert on guide housing 60. As noted more clearly in FIG. 2, adjusting means 80 includes a pair of set screws 82 and corresponding compression springs 84. Each of the pairs of set screws 82 and compression springs 84 is disposed in a respective bore 76, such that the spring 84 is interposed between the set screw 82 and pin 78 to thereby apply a load to the latter. By virtue of this particular construction, the spring 84 can apply greater or lesser magnitude loads on pin 78 in response to the specific setting of the set screws 82. Accordingly, simple and advantageous means is provided for regulating the friction forces applied by the pin 78. Also, the springs 84 by having the tendency to force the pin 78 from the bottom of sliding block 62 correspondingly tend to force such block upwardly into an even tighter engagement with the guide housing 60. Moreover, any abrasive wear on the bottom of pin 78 will be compensated for insofar as the springs 84 tend to continuously force the pin 78 into tight frictional engagement with the guide housing 60. Since the friction can be regulated in both contacting means 58, they can be set at the same values to thereby ensure simultaneous movement whenever contacting suitable caqming tracks adjusted for that end.

Having explained the structural features of the foregoing embodiment, a brief description of its operation will follow. Viewing FIG. 1 from right to left, the transferring apparatus 10 carrying container 14 has its cam rollers 64 engage the leading ends of the guide rods 16 in unison In response to this engagement, the cam rollers 64 will move apart as they travel along the path defined by the contours of the cam track or guide rods 16 as illustrated by the arrows in FIG. 1. The middle apparatus 10 has its slide blocks 62 in their fully retracted or non-grasping position. At this location, of course, the container 14 can be readily removed from apparatus 10 since grasping elements 44 are spaced apart. As indicated, the friction applied by actuating means 30 including pin 78 serves to maintain the rollers 64 in constant engagement by reason of the relative difficulty involved in sliding the same. It will, of course, be understood that the forces provided by the cam rollers 64 contacting guide rods 16 as the apparatus 10 moves along the path is sufficient to overcome the friction of the actuating means 30 including pin 78. Further advancement of the transferring apparatus 10 will cause the cam rollers 64 to contact another set of guide rods 18 to appropriately, simultaneously, and independently force the rollers and associated gripping members 44 inwardly to a grasping position.

It will be appreciated from the foregoing that transferring apparatus 10 enables accommodation of any size container and does not require that changeover adjustments be made to the apparatus. Rather, all that is required for changeover is that the camming tracks 16, 18 be changed to provide for the precise sequences of openings and closings of the grasping elements 44 as well as the extent to which such elements will move.

Figure 3:
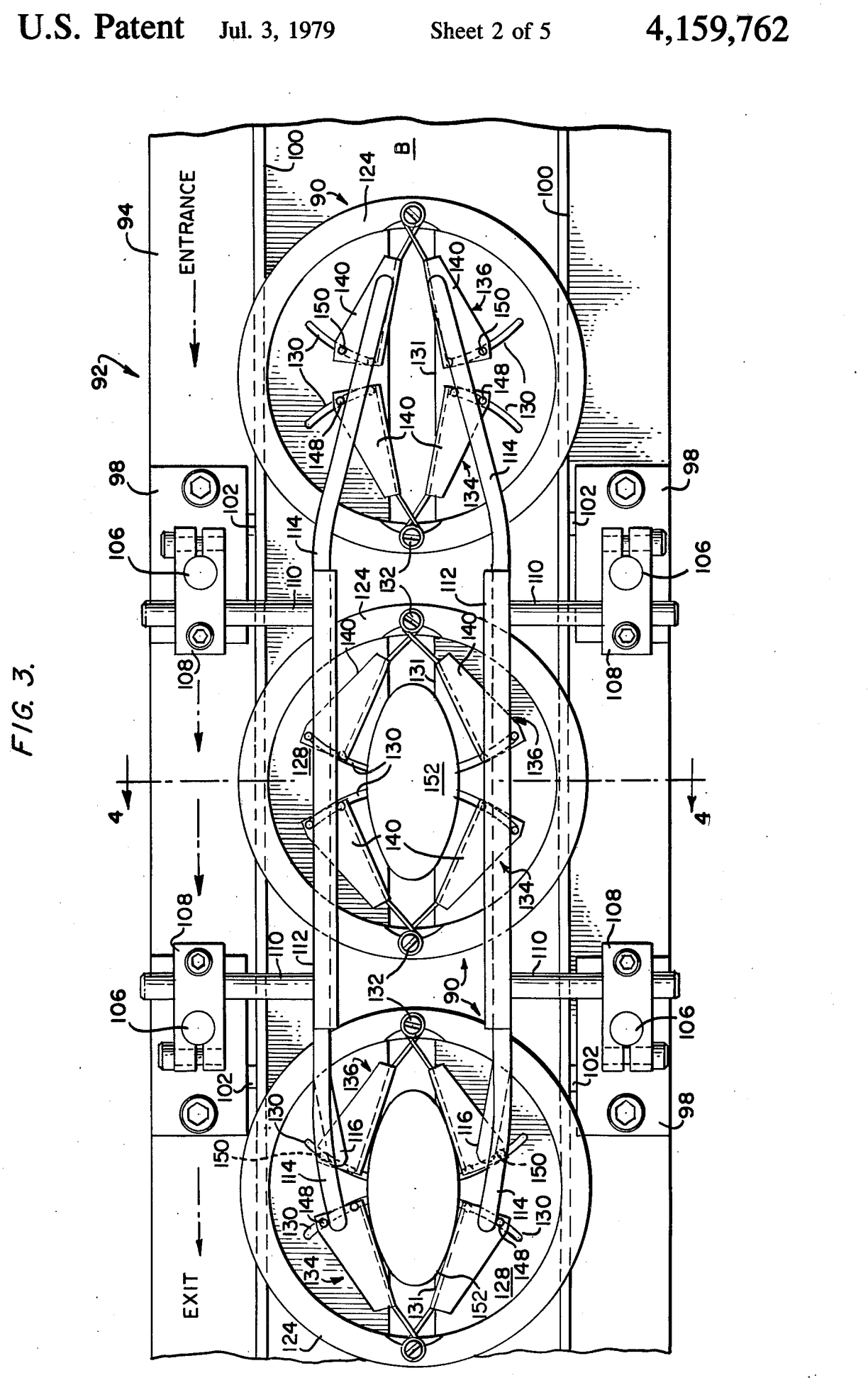
Figure 5:
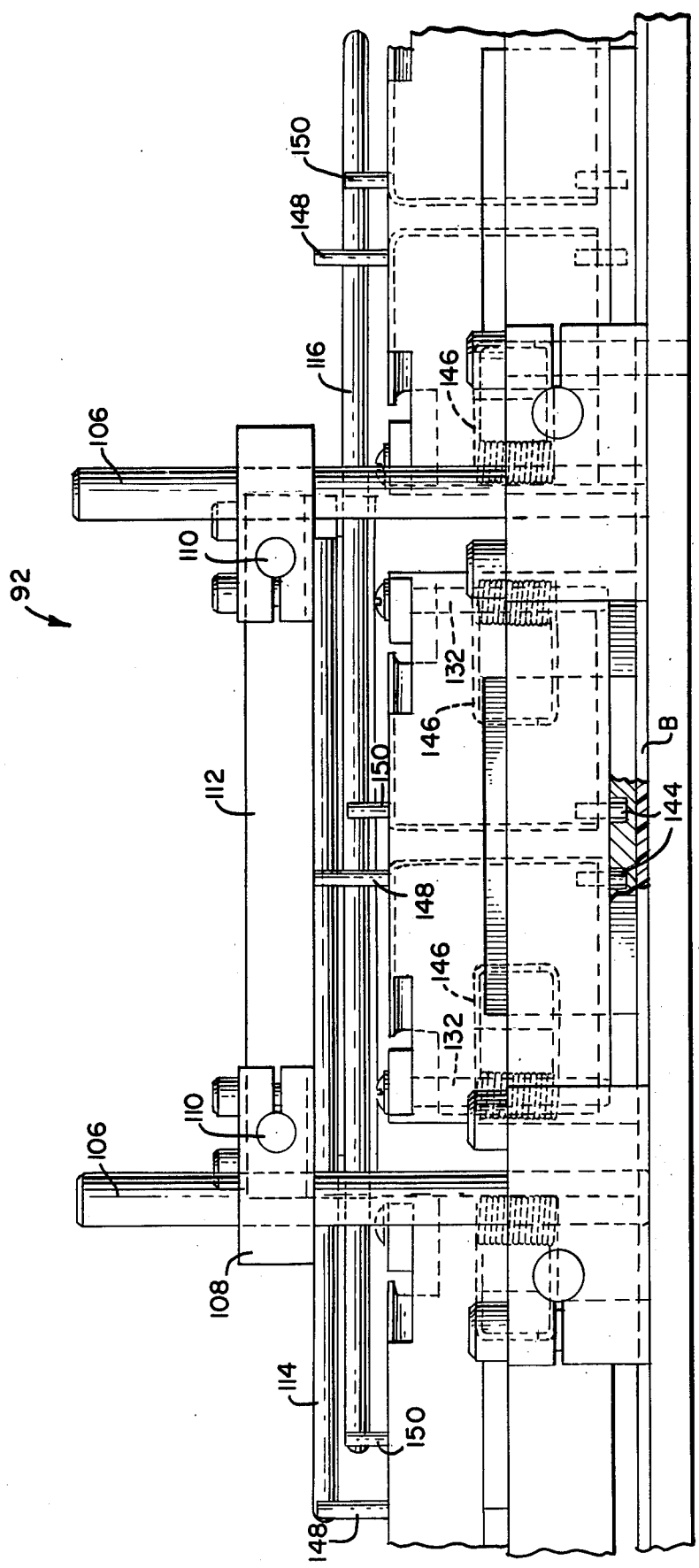
FIG. 5 is a side elevational view of the transfer apparatus and guide system depicted in FIG. 3.

Specifically, referring to FIGS. 3 to 5, there is depicted another embodiment of the transferring apparatus contemplated by this invention which is designated by reference numeral 90. As with the previously described embodiment, this embodiment cooperates with a camming track or guide rail system 92 for actuating the transferring apparatus 90.

With reference to FIG. 3, such system 92 will be seen to include base member 94. Any suitable conveyor belt B moves over base member 94 to transport the apparatus 90. Opposite pairs of mounting blocks 98 are secured to the base 94. Guide rails 100 are secured to guide rail supports 102 by threaded member 104. It will be noted that the guide rail supports 102 extend from the mounting blocks 98 are more completely shown in FIGS. 3 and 4. Accordingly, the guide rails 100 serve to define a guided path for each transferring apparatus 90 which travels therealong. A support post 106 extends vertically from each mounting block 98 and has adjustably secured thereto a conventional clamp 108. As better depicted in FIGS. 3 and 4, horizontally positionable rods 110 are connected to the clamp 108. Guide rod holding devices 112 are suitably secured to and between each free end of rod 110 adjacent sides of the guide rail 100. As best viewed in FIG. 4, the holding devices 112 have a downwardly depending section which is adapted to have secured thereto upper and lower guide rods 114 and 116, respectively. The cooperation between the preceding constructional arrangement and transferring apparatus 90 will be more fully set forth below.

Turning now to transferring apparatus 90, continued reference is made to FIGS. 3 and 4. Transferring apparatus 90 essentially includes housing means 118, gripping means 120, and actuating means 122. The housing means 118 is essentially comprised of a cylindrical shell member 124 having opposed flat sidewalls 126 for cooperating with guide rails 100, and a bottom wall 128 with pairs of arcuate slots 130 formed therein and a generally elongated slot 131 for permitting printing on the bottom of the container. Additionally, the shell member 124 is formed with opposed pivot support shafts 132 suitably mounted in shell body 124 for enabling the pivotal movement of the gripping means 120. The gripping means 120 includes first, or leading, and second, or trailing, pairs of gripping elements 134 and 136, respectively, each pair of which cooperates with suitable pivot support shafts 132 in the shell body. Each of the gripping elements 134 and 136 comprise vertical and horizontal portions 138 and 140, respectively, the vertical portions 138 being hinged by tabs 142 to pivot support shaft 132. Through the foregoing arrangement, the gripping elements 134 and 136 are independently pivotally movable between a gripping position, as illustrated by the leftmost apparatus and non-gripping position, as indicated by the center and rightmost transferring apparatus 90 in FIG. 3.

Specifically referring to FIG. 5, it will be seen that gripping means 120 further includes limit pins 144, each of which is connected to a gripping element and extend downwardly into a portion of the arcuate slot 130. Of course, this arrangement serves to define the extent of pivotal movement for the gripping elements 134 and 136. In this embodiment, gripping elements 134 and 136 are normally biased to the closed position, as shown by the rightmost apparatus in FIG. 1, under the influence of suitable butterfly springs 146 or the like. Such springs 146 are connected to pivot shafts 132 in a well-known manner as well as the outside of the vertical portions 138. By virtue of its inherent resiliency, the spring 146 will yieldingly bias the pairs of vertical portions 138 of each pair of gripping elements 134 and 136, respectively, inwardly towards each other.

As concerns actuating means 122, such includes a pair of actuating pins 148 and 150, respectively. Actuating pins 148 and 150 are associated with horizontal portions 140 to extend upwardly for purposes of engaging the cam tracks or guiding rods 112 and 114. As perhaps best viewed in FIG. 5, actuating pins 148 associated with each of the leading elements 134 are greater in length than pins 150 which are connected to the trailing pair of gripping elements 136. The particular significance of this arrangement is that it enables the simultaneous opening and closing of the gripping elements 134 and 136 at an even rate in a way which is to be made clear.

From the preceding description, it will be appreciated that the operation of transferring apparatus 90 is as follows. For purposes of facilitating such description, reference is made to FIGS. 3 to 5. As depicted at the entrance end, apparatus 90 does not carry an article or container therein. As the apparatus 90 is transferred, both actuating pins 148 and 150 sequentially contact and follow the lower guide rods 116. Accordingly, both pairs of the gripping elements 134 and 136 associated with actuating pins 148 and 150, respectively, move away from each other and can assume the position shown by the middle apparatus 90. Accordingly, a container 152 may be manually or automatically inserted between the gripping elements without the need for special loading clearances being preselected between the gripping elements and container since the gripping members are pivotal to a wide variety of positions. It being understood, of course, that the extent of pivotal movement permitted by each gripping element is limited but, nonetheless, there is a variance which is not otherwise provided by the molded type carrier. By the spacing of guide rods 116, the proper loading clearance of the containers is easily provided without need for changing over the apparatus 90 itself. It will, of course, be understood that butterfly springs 146 result in the guiding pins remaining in constant or continuous contact with the guiding rods 116 during advancement of the apparatus. As the transferring apparatus 90 moves toward the exit end, the guiding pins 148 and 150 remain contacting the guide rods 116. During transit, however, an upper pair of guide rods 114 will contact the leading pair of longer guiding pins 148. As noted, the upper pair of guiding rods 114 extend above and beyond the free ends of the lower guide rods 116 by appropriate distances to insure that both pairs of gripping elements 134 and 136 can simultaneously close about the container 152 at the same rate.

Through butterfly springs 146, the gripping elements 134 and 136 maintain a relatively tight frictional grip on the container 152 during transit. By virtue of the above, it is believed apparent that apparartus 90 can also accommoate a wide variety of different dimensioned containers.

Figure 6:
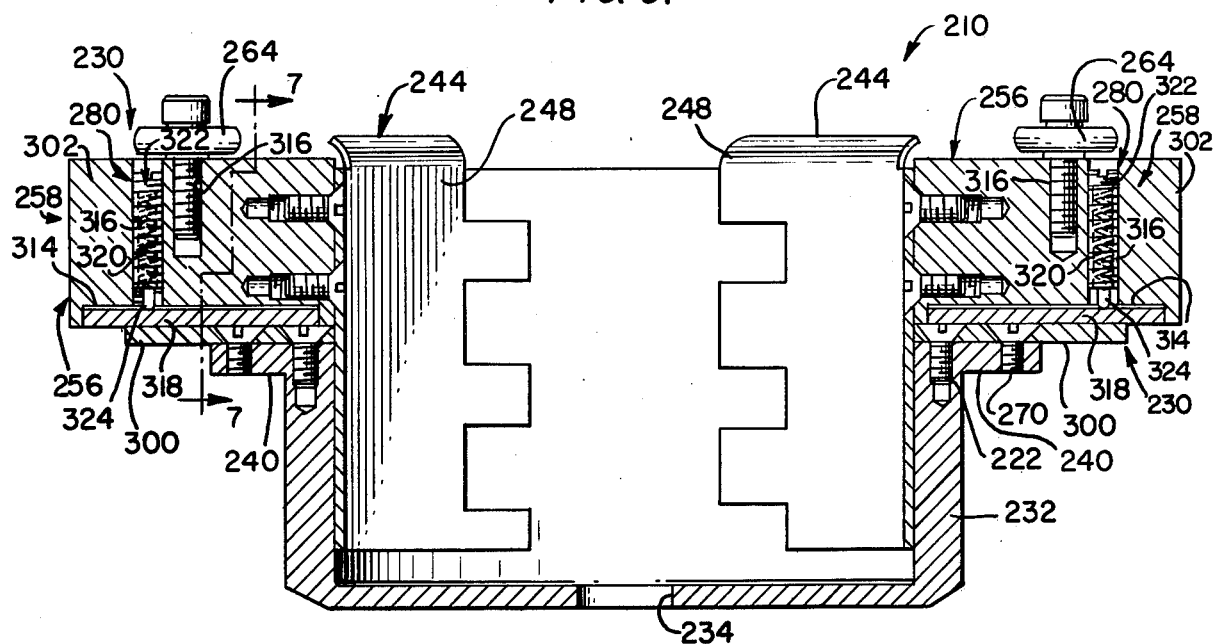
FIG. 6 is a cross-sectional view of a preferred embodiment of the transferring apparatus made in accordance with the principles of the instant invention.
Figure 7:
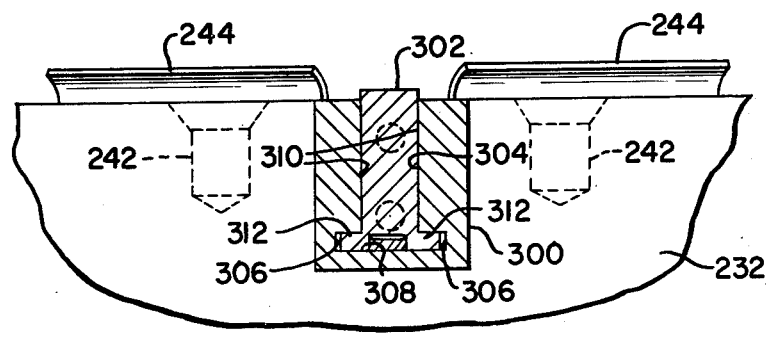
FIG. 7 is a cross-sectional view taken substantially along the section line 7—7 appearing in FIG. 6 and illustrating other structural aspects of this invention.

Referring to the preferred embodiment of the present invention, it is more clearly illustrated in FIGS. 6 and 7. It should be pointed out that parts corresponding to those of the construction shown in FIGS. 1 and 2 have been designated by similar reference characters with, however, the addition of the prefix 2.

This particular embodiment is similar in many respects to the noted embodiment of FIGS. 1 and 2 but primarily differs in that it discloses a somewhat different and unique pair of actuating means 230. Essentially described, individual actuating means 230 include sliding means 256 and contacting means 258. Moreover, each of the pair of actuating means 230 is rigidly connected to respective ones of the gripping elements 244 for purposes of controlling and enabling the latter to move inwardly and outwardly between grasping and non-grasping positions. It will be appreciated that such reciprocating movement imparted to gripping elements 244 is similar to that which occurs in operation of the first described embodiment.

Sliding means 256 is defined by a guide housing 300, sliding tee-block 302 and actuating element or cam roller 264. The guide housing 300 has, in cross section, a generally rectangular configuration with, however, a tee-shaped recess 304 formed longitudinally therein. Recess 304 has lateral cut-outs 306, flat base 308, and opposed spaced apart and generally parallel side walls 310. Cap screws 270 and 272 appropriately fixedly connect the flat base 308 of guide housing 300 to a respective one of the support flanges 240.

In connection with the sliding tee-block 302, it will be appreciated, of course, that such is complementary shaped to somewhat snugly fit and slidably move within the recess 304 formed in guide housing 300. Sliding block 302 is formed with flanges 312 that cooperate with cut-outs 306. Further, the sliding block 302 has formed along the bottom surface thereof, an elongated notch 314. The particular significance of notch 314 will be subsequently described. In addition, sliding block 302 is formed with a pair of spaced apart vertical threaded bores 316. Cam roller 264 is threadedly fastened by a rod to one of the innermost bores 316. Cam roller 264 is intended to continuously engage and follow the contours of the camming track. Accordingly, they effectuate the corresponding opening and closing of the gripping members 244.

Contacting means 258 includes generally elongated flat friction pin member 318 which is received within the notch 314 of block 302 for producing friction to generally impede movement of the block. Friction pin 318 frictionally engages flat base 308 of the guide housing 300. It is preferably made from an appropriate material which is capable of creating friction while being able to withstand prolonged periods of use. In particular, any suitable material having the desired friction producing and wear characteristics can be applied for achieving the foregoing end. The frictional forces are preselected to be rather substantial so cam rollers 264 continuously engage the camming tracks and are only moved by action of the camming tracks. Since the cam rollers 264 continuously engage the camming tracks without inadvertently moving to an unintended position the gripping elements 244 can correspondingly advance and retract in a simple, reliable, simultaneous and independent fashion.

Contacting means 258 of this particular embodiment also includes friction force adjusting means 280. Principally, adjusting means 280 serves the purpose of adjusting the amount of frictional forces applied by the friction pin 318 on guide housing 300. Adjusting means 280 similarly functions in the manner indicated with respect to adjusting means 80. In this particular embodiment, however, the adjusting means 280 is somewhat structurally simpler than such previously described embodiment. More specifically, adjusting means 280 includes a single conventional and commercial type of spring plunger set screw unit 320. This particular set screw spring plunger 320 is threadedly fastened in the outermost bore 316. Since the particular construction of the spring plunger is generally well known in the art a detailed description of its construction and operation will be dispensed with. To better understand, however, the application of the spring plunger 320 in the present invention only those portions thereof necessary for such understanding will be commented upon. Basically, it should be understood that by suitably adjusting the set screw 322 the amount of force applied by the spring on plunger portion 324 can be varied. Accordingly, the frictional forces which friction pin 318 exerts on the guide housing 300 is rather accurately regulated and varied. The spring plunger 320 will serve to downwardly force the friction pin 318 so that it fits tightly against the bottom surface of base 308. Conjointly the spring plunger acts to force the sliding block 302 into firm engagement with the guide housing 300. In this manner the upper surfaces of flanges 312 are in tight frictional engagement with the housing 300 at the corresponding cut-out portions 306. As a result of this particular arrangement, it will be understood that the sliding or reciprocatory movement of the sliding block 302, between its open and closed positions is assured of being accomplished in a generally linear fashion. Consequently, any adverse effects during the reciprocating motion of block 302, such as tilting or wedging, are eliminated. Moreover, the type of sliding frictional engagement of block 302 will be generally continuous and uniform between the gripping and non-gripping positions of gripping members 244. Such an approach serves to provide a reliable means for achieving the successful and continuous sliding movement of the block 302 with respect to the housing 300.

Apart from the preceding advantages available through application of spring set plunger units 320 is the fact that as the friction pin 318 wears after continued use, adjustment of the set screw 322 to force the pin 318 downwardly will be able to compensate for such wear by ensuring that the pin contacts the guide housing 300.

In view of the foregoing description it is believed that the operation of the present embodiment is readily understood with reference to the first described embodiment. It will be understood that as the apparatus 210 travel along the path defined by the guide rods, tee-blocks 302 will be moved from their retracted or non-grasping positions towards their inwardly extended grasping positions. The inward sliding movement or advancement of the sliding tee-blocks 302 is, preferably, timed to be conjoint for purposes of uniformly grasping and centering the containers to be held by opposed grasping members 244. As previously indicated, the containers will be moved so that they are positioned above the slot 234. In this manner the bottom surface of the containers may be appropriately printed with suitable indicia.

Mention should also be made that by virtue of the above construction even the irregular feeding of a container within the canister will not affect its proper centering position, since the incline surfaces 48, 148, and 248 serve to wedge the container member in a centered position. As observed, by reason of the sufficient frictional forces generated by the friction pin and slide block on the guide housing there is a diminished tendency for these members to be inadvertently moved by virtue of contact with surrounding structure. Accordingly, the containers will not be inadvertently displaced.

From the preceding description, it will be appreciated that transferring apparatus 10, 90 and 210 are able to accommodate containers having varying sizes without requiring any changeover adjustments being made to the apparatus 10, 90 and 210 themselves. Moreover, positive gripping and centering actions by the gripping elements on the containers are achieved in a simple and highly reliable fashion. The transferring apparatus are also versatile from the standpoint of being able to accommodate containers which may be made such that their dimensions are out of specification with the expected dimensions of the containers being transferred. Aside from the foregoing advantages, the transferring apparatus also eliminate the requirement of minimum clearance requirements for container loading. Moreover, such apparatus furnish the containers stability during transport since there is the positive gripping action and the reduction or elimination of the gripping element, being inadvertently moved. From the foregoing considerations, it will be further recognized that apparatus 10, 90 and 210 provide a carrier which can be continuously used for similar and dissimilar lines of product, as well as eliminate manufacturing, storage and handling costs of conventional molded carrying containers.

While the invention has been described in connection with preferred embodiments, it is to be understood that it is not intended to limit this invention to the particular forms set forth above but, on the contrary, it is intended to cover such alternatives, modifications, and equivalents as may be included within the spirit and scope of the invention as defined by the appended claims.

I claim:
1. A transfer apparatus which comprises in combination,
   (a) housing means defined by a cylindrical shell-type walled member having a bottom;

(b) gripping means disposed within the housing means and having an opposed pair of interfitting gripping members each of which is fixedly connected to oppositely disposed actuating means for movement between gripping and non-gripping positions;

(c) a plurality of retaining bores disposed in said housing to removably receive driving projections of a transfer mechanism;

(d) said actuating means having sliding means and contacting means, said sliding means disposed within a guide housing and supporting a cam follower; and (e) said contacting means having an adjusting member to control the amount of frictional forces to be exerted on the guide housing to inhibit movement of the sliding means;

(f) whereby movement of the cam follower causes the sliding means of the actuating means to move the interfitting gripping members between gripping and non-gripping positions.

2. An apparatus as set forth in claim 1 in which each of said gripping elements is formed with a pair of inclined surfaces so oriented as to center the container therebetween and relative to said apparatus.

3. An apparatus as set forth in claim 1 in which each of the sliding means includes a guide housing connected to the housing means, and having a generally tee-shaped opening and a correspondingly tee-shaped sliding block slidable in said opening with respect to the guide housing, wherein each sliding block has the actuating member connected thereto.

4. An apparatus as set forth in claim 3 in which said contacting means includes a friction member removably associated with the sliding block for frictionally contacting the guide housing to thereby inhibit movement of the sliding block, the friction member producing substantial frictional forces such that it ensures that said cam actuating members continuously engage the camming members during contact therewith and are only moved as a result of cooperation with the camming members.

5. An apparatus as set forth in claim 4 in which each of said inclined surfaces of said gripping elements is formed with projections and recesses at their ends which are constructed so that whenever said first gripping element is moved toward said second gripping element said projections on said first gripping element receivably cooperate with said recesses on said second gripping element, and said projections on said second gripping element receivably cooperate with said recesses on said first gripping element.

6. An apparatus for transferring containers of different dimensions along a predetermined path defined by a conveying mechanism provided with camming members at selected points along the path, said apparatus comprising in combination housing means being transportable along the predetermined path, gripping means including at least one pair of first and second gripping elements connected to the housing means and movable between a gripping position whereat a container is firmly and positively gripped, and a non-gripping position whereat the container can be freely moved from between said elements; and actuating means including separate actuating members, each connected to corresponding ones of said gripping elements and being independently and continuously engageable with the camming members for enabling movement of the gripping elements between said gripping and non-gripping positions at an even rate, contacting means defining a friction member removably associated with a slide block for frictionally contacting the guide housing to inhibit movement of said sliding block, and said contacting means includes adjusting means for regulating the amount of friction exerted by said friction member and block on said guide housing, and wherein said actuating means includes the sliding means connected to said housing means and each of said actuating members, the contacting means being connected to the sliding means for enabling continuous and simultaneous contact of said actuating members with the camming members; and each of the sliding means includes a guide housing connected to the housing means, and the sliding block is slidable with respect to the guide housing, wherein each sliding block has said actuating member connected thereto.

7. An apparatus as set forth in claim 2 in which said adjusting means includes at least a set screw threadedly connected to the sliding block, and a resilient means operatively connected to the sliding block and being interposed between said set screw and said friction member, such that said set screw can be linearly adjusted to vary a biasing force provided by the resilient means on said friction member.

8. An apparatus for transferring containers of different dimensions along a predetermined path defined by a conveying mechanism provided with camming members at selected points along the path comprising housing means being transportable along the predetermined path, gripping means including at least one pair of first and second gripping elements connected to said housing and being movable between a gripping position whereat a container is firmly and positively gripped, and a non-gripping position whereat the container can be freely moved from between said elements; and actuating means including separate actuating members, each connected to corresponding ones of said gripping elements and being independently and continuously engageable with the camming members for enabling movement of the gripping elements between said gripping and non-gripping positions at an even rate, said actuating means includes sliding means connected to said housing means and each of said actuating members for enabling movement of said gripping members between said gripping and non-gripping positions, and contacting means connected to said sliding means for enabling continuous and simultaneous contact of said actuating members with the camming members, each of said sliding means includes a guide housing connected to said housing means, and having a generally tee-shaped opening and a correspondingly tee-shaped sliding block slidable in said opening with respect to said guide housing, wherein each sliding block has said actuating member connected thereto, said contacting means includes a frictional member removably associated with said slide block for frictionally contacting said guide housing to thereby inhibit movement of said sliding block, said contacting means includes adjusting means for regulating the amount of friction exerted by said friction member on said guide housing, each of said gripping elements is formed with a pair of inclined surfaces so oriented as to center the container therebetween and relative to said apparatus, said inclined surfaces being formed with projections and recesses at their ends which are constructed so that whenever said first gripping element is moved toward said second gripping element said projections on said first gripping element receivably cooperate with said recesses on said second gripping element, and said projections on said second gripping element receivably cooperate with said recesses on said first gripping element.

9. An apparatus as set forth in claim 8 in which said adjusting means includes an adjustable set screw spring plunger threadedly connected to said sliding block, such that said set screw spring plunger can be adjusted to vary the biasing force on said friction member.

10. An apparatus for transferring containers of different dimensions along a predetermined path defined by a conveying mechanism provided with camming members at selected points along the path comprising housing means being transportable along the predetermined path, gripping means including at least one pair of first and second gripping elements connected to said housing and being movable between a gripping position whereat a container is firmly and positively gripped, and a non-gripping position whereat the container can be freely moved from between said elements; and actuating means including separate actuating members, each connected to corresponding ones of said gripping elements and being independently and continuously engageable with the camming members for enabling movement of the gripping elements between said gripping and non-gripping positions at an even rate, said gripping means includes a second pair of gripping elements, and said actuating members being defined by a first pair of elongated pins having a first predetermined height, each one of said first pins being attached to a respective one of said one pair of gripping elements, and a second pair of pins having a second predetermined height which is less than said first predetermined height and being attached to respective ones of said second pair of gripping elements, said first and second pairs of pins cooperating with the fixed camming members to enable independent and simultaneous movement of said first and second pairs of gripping members between said gripping and non-gripping positions at the same rate.

11. An apparatus for transferring containers of different dimensions along a predetermined path defined by a conveying mechanism provided with camming members at selected points along the path comprising housing means being transportable along the predetermined path, gripping means including at least one pair of first and second gripping elements connected to said housing and being movable between a gripping position whereat a container is firmly and positively gripped, and a non-gripping portion whereat the container can be freely moved from between said elements; and actuating means including separate actuating members, each connected to corresponding ones of said gripping elements and being independently and continuously engageable with the camming members for enabling movement of the gripping elements between said gripping and non-gripping positions at an even rate, the contacting means including a friction member removably associated with a slide block for frictionally contacting the guide housing to inhibit movement of the sliding block, said contacting means including adjusting means for regulating the amount of friction exerted by the friction member and block on the guide housing, said adjusting means including an adjustable set screw spring plunger threadedly connected to said sliding block, such that said set screw spring plunger can be adjusted to vary the biasing force on said friction member, and wherein said actuating means includes the sliding means connected to said housing means and each of said actuating members, the contacting means being connected to the sliding means for enabling continuous and simultaneous contact of said actuating members with the camming members; and wherein each of the sliding means includes a guide housing connected to the housing means, and the sliding block is slidable with respect to the guide housing, wherein each sliding block has said actuating member connected thereto.

12. An apparatus for transferring containers of different dimensions along a predetermined path defined by a conveying mechanism provided with camming members at selected points along the path comprising housing means being transportable along the predetermined path, gripping means including at least one pair of first and second gripping elements connected to said housing and being movable between a gripping position whereat a container is firmly and positively gripped, and a non-gripping position whereat the container can be freely moved from between said elements; and actuating means including separate actuating members, each connected to corresponding ones of said gripping elements and being independently and continuously engageable with the camming members for enabling movement of the gripping elements between said gripping and non-gripping positions at an even rate, said actuating means includes sliding means connected to said housing means and each of said actuating members for enabling movement of said gripping members between said gripping and non-gripping positions, and contacting means connected to said sliding means for enabling continuous and simultaneous contact of said actuating members with the camming members, each of said sliding means for enabling continuous and simultaneous contact of said actuating members with the camming members, each of said sliding means includes a guide housing connected to said housing means, and having a generally tee-shaped opening and a correspondingly tee-shaped sliding block slidable in said opening with respect to said guide housing, wherein said sliding block has said actuating member connected thereto, said contacting means includes a friction member removably associated with said slide block for frictionally contacting said guide housing to thereby inhibit movement of said sliding block, said contacting means includes adjusting means for regulating the amount of friction exerted by said friction member and sliding block on said guide housing, each of said gripping elements is formed with a pair of inclined surfaces so oriented as to center the container therebetween and relative to said apparatus, said inclined surfaces being formed with projections and recesses at their ends which are constructed so that whenever said first gripping element is moved toward said second gripping element said projections on said first gripping element receivably cooperate with said recesses on said second gripping element, and said projections on said second gripping element receivably cooperate with said recesses on said first gripping element, said adjusting means includes an adjustable set screw spring plunger threadedly connected to said sliding block, such that said set screw spring plunger can be adjusted to vary the biasing force on said friction member.

* * * * *

UNITED STATES PATENT AND TRADEMARK OFFICE
CERTIFICATE OF CORRECTION

PATENT NO. : 4,159,762
DATED : July 3, 1979
INVENTOR(S) : Joseph P. Bulwith

It is certified that error appears in the above-identified patent and that said Letters Patent are hereby corrected as shown below:

Column 1, line 32, "eachtime" should be --each time--.

Column 2, line 15, "a" should be deleted.

Column 2, line 19, after "gripping" --elements connected to the housing and being movable between a gripping-- has been omitted.

Column 2, line 44, after "of" (first occurrence), insert --the--.

Column 2, line 50, "components" should be --component--.

Column 4, line 8, "angular" should be --angularly--.

Column 6, line 2, insert a period (.) after "unison".

Column 8, line 21, "commoate" should be --commodate--.

Signed and Sealed this

Twenty-third Day of October 1979

[SEAL]

Attest:

RUTH C. MASON
Attesting Officer

LUTRELLE F. PARKER
Acting Commissioner of Patents and Trademarks